United States Patent Office 3,386,318
Patented June 4, 1968

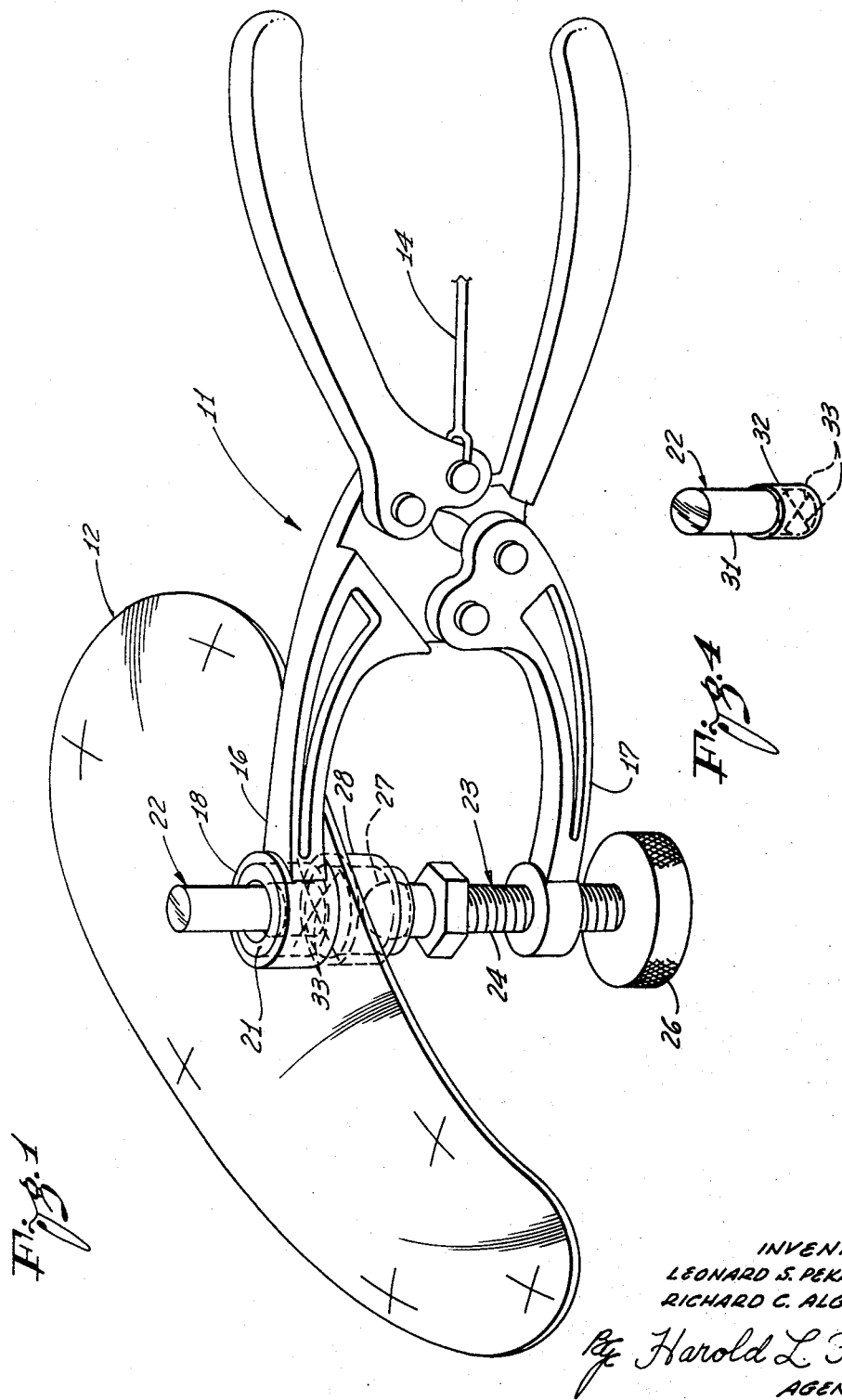

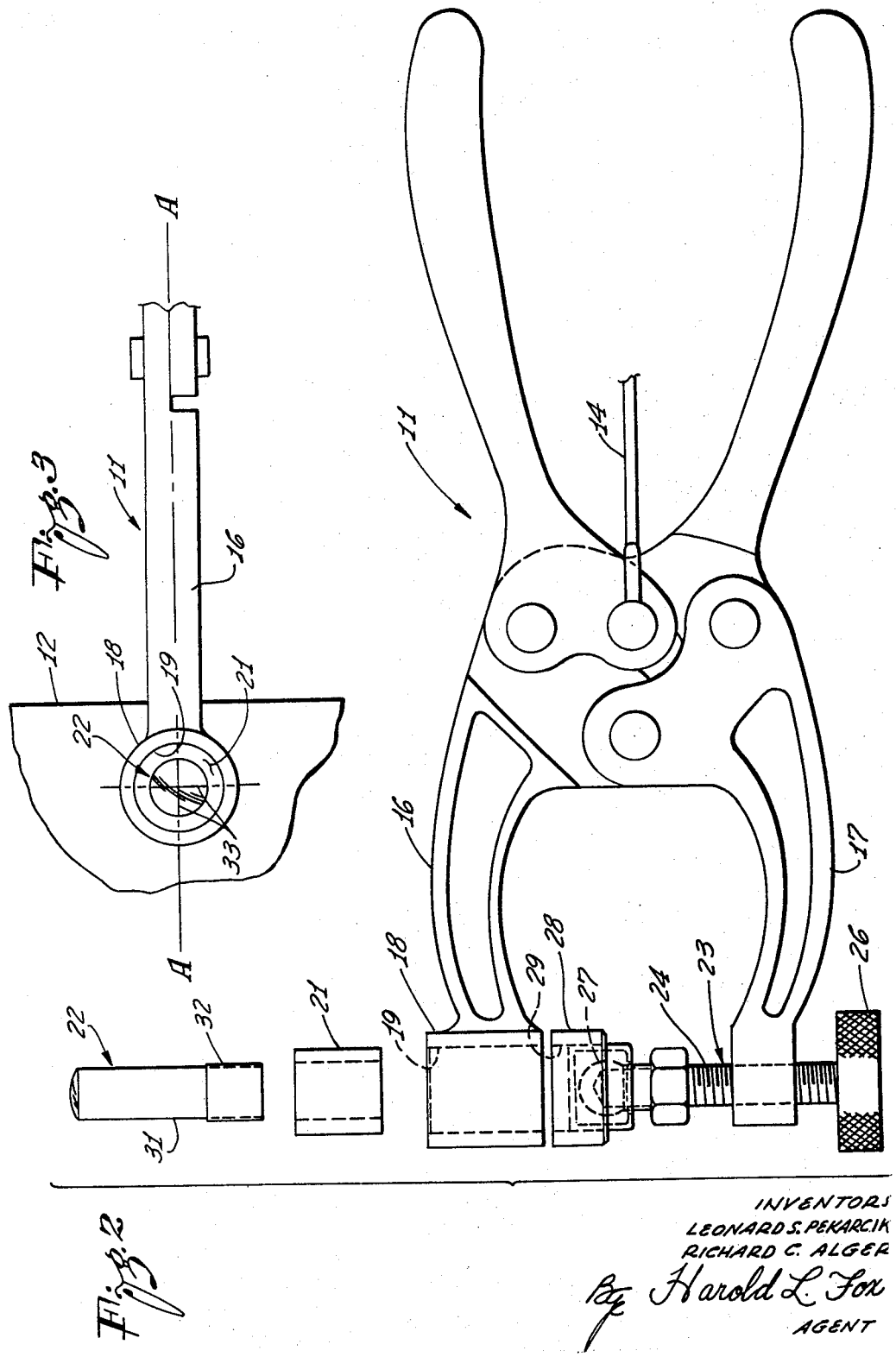

3,386,318
PRECISION DRILL CLAMP
Leonard S. Pekarcik, Torrance, and Richard Charles Alger, Los Angeles, Calif., assignors to Northrop Corporation, Beverly Hills, Calif., a corporation of California
Filed Mar. 4, 1966, Ser. No. 532,001
4 Claims. (Cl. 77—62)

ABSTRACT OF THE DISCLOSURE

A tool adapted to be attached (clamped) on a curved or flat plate, sheet etc., facilitating the drilling of a hole therein and in which the axes of the hole has a normal relation with respect to the surface of the plate.

---

This invention relates to precision tools and more particularly to a tool facilitating the accurate location of and subsequently providing a guide for drilling a hole in a work-piece having curved, contoured or plane surfaces.

Frequently an individual hole—or at most a small number of holes are called out to be formed (drilled) in a work-piece; alternately it frequently becomes necessary to accurately locate and form (drill) additional holes in a work-piece initially fabricated in a jig or fixture. Effecting an operation of this character presents numerous problems, particularly so if the work-piece has curved, contoured or irregular surfaces. If the operation is effected by mechanical means the operation becomes expensive and time consuming. If the operation is performed by hand, holding a work-piece proves troublesome and determining and maintaining the proper location and relation of a hole in the work-piece also proves to be a difficult operation.

It is an object of the present invention to disclose means for establishing the exact location of a hole to be formed (drilled) in a work-piece.

Another object is to disclose means adapted to maintain a fixed relation between one or more work-pieces and also provides a guide for a drill functioning to drill a hole in the work-piece or work-pieces.

Another object is to disclose means enabling a hole to be formed (drilled) in a work-piece having curved, contoured or plane surfaces and in which the axis of the hole is substantially normal to a plane having a tangential relation with respect to the curved or contoured surface at the intersection thereof with the axis of the hole.

Another object is to disclose means eliminating the possibility of damage or injury to a work-piece or the operator thereof, is of simple construction and is economical to manufacture and operate.

Briefly, the device (tool) as disclosed herein comprises—for the most part—conventional clamping means. In the embodiment shown the tool comprises a pair of pliers commonly referred to as channel lock pliers, the pliers are characterized in that they retain their clamping relation when urged to the latter position and embody readily releasable means whereby the pliers are free to return to a non-clamping position. The jaw members of the pliers are modified, the upper jaw (FIGURE 1) terminates in an annular end while the lower end terminates in an adjustable and pivotally mounted support pad. Mounted in the annular end is a removable bushing adapted to receive an optical sight embodying cross-hairs. In view of this brief description, it will now be apparent that the pliers can be positioned and clamped on a work-piece with the cross-hairs coinciding or super-imposed directly over scribe lines previously scribed on the work-piece. The optical sight and aforementioned bushing are now removed from the upper jaw and a bushing having a different I.D. is substituted for the removed bushing. Thus it will be seen that means is provided whereby a hole, generally normal to a curved, contoured or plane surface, may be drilled in a work-piece.

A more complete understanding of the invention and various objects and advantages thereof will be forthcoming by referring to the following detailed description taken in conjunction with the accompanying drawings, in which:

FIGURE 1 is a perspective view of the means disclosed herein in an operational position thereof on a curved sheet (work-piece).

FIGURE 2 is a side elevational view of the means of FIGURE 1 showing in exploded relation certain components of the subject means.

FIGURE 3 is a fragmentary top plan view of the means of FIGURE 1.

FIGURE 4 is a perspective view of optical sight comprising a component of the means of FIGURES 1, 2 and 3.

Referring to the drawings, FIGURE 1 shows channel lock pliers 11, modified as disclosed herein, positioned in their clamped relation on a curved sheet 12. The pliers 11 are characterized in that they have a locked position, in which outer end portions of the jaw members 16 and 17 contact and maintain a fixed relation on the sheet 12, at such time as the handles of the pliers are urged a predetermined distance toward each other. The pliers 11 are freed to assume a released position at such time the trigger member 14 is depressed. Thus, it will be seen that upon urging the pliers to their locked position the relation of the pliers 11 and sheet 12 will be maintained without the application of external forces until released by actuation of the trigger member.

The novel structure of the present invention resides in modification of the end portions of the jaw members 16 and 17 and the additional components thereto. An annular member 18 is secured to the outer end of the upper jaw member 16—as viewed in FIGURES 1, 2 and 3—as by welding or the like, referred to as first clamping means. An aperture 19, provided in the member 18, receives a bushing 21 which in turn carries an optical sight 22, the latter to be further described as the disclosure progresses.

Carried at the outer end of the lower jaw member 17 (FIGURES 1 and 2) is an assembly 23. The assembly 23 comprises a threaded member 24 received in a threaded bore provided in the outer end of the jaw member 17, the lower end of the member 24 terminates in a hand nut 26 utilized to turn the member 24 in clockwise or counter-clockwise direction in the aforementioned threaded bore. The upper end of the member 23 is of spherical configuration as indicated by the numeral 27. Mounted for universal pivotal movement on the end 27 is a pad member 28, referred to as second clamping means. The central portion of the upper end of the member 28 is depressed as indicated by the numeral 29, the depression 29 provides clearance and indicating means for a drill bit as the latter completes a hole in the sheet 12 as explained presently.

As modified it will be apparent that the assemblies 18 and 23 have a symmetrical relation with respect to the pliers 11, the plane being represented by the line A—A is hereinafter referred to as the symmetrical plane of the pliers 11 (FIGURE 3).

The optical sight 22 includes transparent and band members 31 and 32, respectively. The member 31, generally of cylindrical configuration is fabricated of clear plastic or similar material. The band member 32 is mounted in fixed encircling relation at the lower end of the member 31. Cross-hairs 33, constituting diameters of the member 31 and having a ninety degree (90°) relationship with respect to each other, are provided in the lower end of member 31.

It will be understood that the members 21 and 32 has sliding but smug relations within the members 18 (bore 19) and 21 (I.D.) respectively, whereby the sight assembly 22 and member 21 may be easily removed and replaced as desired. It will also be understood that drill bushings (not shown), having the same O.D. as member 21, but with various I.D.'s as required to accommodate various sized drills, may be substituted for the bushing member 21.

The components and arrangement of the pliers 11 having been described a better understanding thereof will be forthcoming from the following description of their operation. For purposes of illustration it is assumed a plurality of holes are to be drilled around the periphery of the sheet 12.

It will be noticed that the sheet 12 is slightly curved and seven (7) holes are to be drilled therein. Assuming also that fabrication of the sheet 12 constitutes a single operation, the fallacy of designing and constructing a holding fixture for this type of operation is obvious. The holes may be drilled by hand which also presents numerous and troublesome problems—for example, the sheet 12 is difficult to hold, there is the possibility of damage to the sheet and injury to the operator and—although initially the holes may be centered with respect to scribe lines—there is no assurance the axes of the holes will be normal to the surface of the work-piece. Accordingly, although the hole may be correctly positioned initially, it may be off several hundredths of an inch as the drill breaks through on the lower (opposite) side of the sheet 12. Utilization of the subject device (pliers 11) eliminates practically all the problems and discrepancies discussed above.

The pliers 11 are first clamped on the sheet 12, substantially as shown in FIGURE 1, minor adjustments probably will be required insuring that the intersections of the cross-hairs 33 coincide or are superimposed directly above the scribe lines on the sheet 12. Also the pliers 11 are held so that the axis of the annular member 18 is substantially normal to the sheet 11 at the intersection (directly above) the intersection of the scribe lines on the sheet 12. The foregoing operation is accomplished by visual observation, this is effected easier and more efficiently due to the elongated sight assembly 23, in other words the relation of the finished hole in the sheet 12 is rendered easier and effected more efficiently by the assemblies 22 and 23 with respect to the sheet 12.

After the annular member 18 is positioned and clamped on the sheet 12 as described above means (not shown) maintain the pliers 11 in their clamped or locked position, thus the operator is free to perform the drilling operation. Accordingly he removes the sight 22 and bushing 21 from the annular portion 18 of the pliers 11 and replaces them with a bushing (not shown) having an I.D. required to receive a drill of the required diameter. As the drill egresses from lower side of the sheet 12 it enters the depression 29, the depression providing an indication to the operator that the hole has been effected and also eliminates wear on the drill bit.

Thus a substantially true (normal to the surface of the sheet 12) hole is effected (drilled) in the sheet 12. The operation outlined above is now repeated to form (drill) the other holes in the sheet 12.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

We claim:
1. A tool facilitating the drilling of holes in plane or curved plates or the like in which the axes of the holes have substantially a normal relation with respect to the surface of the plate, comprising:
 (a) a clamping tool of plier-like configuration including a pair of opposing jaw members terminating in first and second clamping means;
 (b) said first and second clamping means being at least in part of hollow cylindrical configuration having at least one plane surface adapted to abut each other;
 (c) said first clamping means being integrally constructed with the jaw member with which it is associated;
 (d) said second clamping means being adjustably mounted for universal pivotal movement on the jaw member with which it is associated;
 (e) said tool adapted to be actuated between a locked position in which said first and second clamping means have fixed relations with respect to each other and a released position in which said first and second clamping means are movable with respect to each other;
 (f) and said second clamping means including drill guide means, the axis of which drill guide means has a normal relation with respect to the surfaces of the plate, at such time as said tool is in said locked position on the plate.
2. Apparatus as set forth in claim 1:
 (a) in which each of said first and second clamping means includes hollow cylindrical members open at at least one end thereof.
3. Apparatus as set forth in claim 1:
 (a) in which the open ends of said first and second clamping means are in opposed relation at such time as said tool is in said locked position.
4. Apparatus as set forth in claim 3:
 (a) in which said second clamping means includes an elongated cylindrical optical sight replaceable with a drill bushing functioning to direct a drill bit in a desired location and direction.

References Cited

UNITED STATES PATENTS

| | | | |
|---|---|---|---|
| 2,181,746 | 11/1939 | Siebrandt | 77—62 XR |
| 2,322,707 | 6/1943 | Wetzler | 77—63.7 |
| 2,674,907 | 4/1954 | Zoll | 77—62 |
| 2,996,936 | 8/1961 | Blaise | 77—62 |

FRANCIS S. HUSAR, *Primary Examiner.*